UNITED STATES PATENT OFFICE 2,039,734

NEW COMPOSITIONS OF MATTER CONTAINING LUMINOUS SUBSTANCES

Georg Meder, Munster, (Taunus), and Konrad Schad, Frankfort-on-the-Main-Hochst, Germany, assignors to I. G. Farbenindustrie Aktiengesellschaft, Frankfort-on-the-Main, Germany No Drawing. Application February 23, 1933, Serial No. 658,246. In Germany March 1, 1932

1 Claim. (Cl. 134—26)

The present invention relates to new compositions of matter containing luminous substances.

The hitherto known luminous paints, particularly those containing alkaline earth oxides or sulfides as luminous substances, have a relatively short life as they are not weatherproof and are easily disintegrated when exposed to air. The same applies to zinc sulfide-paints.

Many attempts have been made in order to overcome this drawback. It has been proposed to apply lacquer coatings to the luminous substances or to embed the latter in materials which are transparent and weatherproof, such as wax or the like. However, none of the products which up to now have been proposed for this purpose combines a sufficient fastness to weather with chemical indifference. Most of them chemically react with the sulfides thus accelerating the decomposition. Others, though chemically indifferent are not sufficiently transparent to the ultraviolet rays which are the most effective in exciting the luminescence effect.

We have now found that the polymerized aromatic hydrocarbons selected from the group consisting of polystyrene polymerized vinyl naphthalene, polymerized vinyl tetrahydronaphthalene and a homologue of any of them are far superior to all hitherto used embedding agents. The said products are distinguished by chemical indifference, they are much more weatherproof than the hitherto used embedding agents and show a high refractive power.

We have furthermore found that the phosphorescence effect of the luminous substances is considerably increased if they are embedded in one of the said substances. As homologues of polystyrene, polymerized vinyl naphtalene etc. may be used, for instance, the polymerization products of methyl styrene, ethyl styrene, methyl vinyl naphthalene and the like.

The object of our invention is the new composition of matter comprising a polymerized aromatic hydrocarbon of the character described having incorporated therein a luminous substance which is insoluble in the polymerized hydrocarbon. These compositions have a life several times as long as that of compositions prepared by means of the hitherto used embedding agents. The polymerized hydrocarbons can be hardened to form a clear transparent and weatherproof mass.

The new compositions can be worked up to form lacquers as well as to form moulded articles, bands, sheets and the like. They can be prepared in any desired manner, for instance, by adding the luminous substance to the unpolymerized hydrocarbon and then polymerizing the mixture or by starting from a partly polymerized hydrocarbon which after the addition of the luminous substance must be hardened.

The following examples serve to illustrate the invention, but they are not intended to limit it thereto:

1. ¼ kilogram of polystyrene is dissolved in a mixture of ¼ kilogram each of toluene, xylene and butyl acetate; about 40 grams of tricresyl phosphate are added as a softening agent and about 1 kilogram of a luminous paint, for instance on the base of strontium sulfide/bismuth and rubidium, is carefully introduced, while stirring. The lacquer of luminous paint thus obtained can be applied on ceiling-plaster and wall-plaster, porcelain, glass, wood, aluminium, metallic supports, paper, pasteboard, artificial foils or the like, i. e. on any desired base. In some cases it is advisable to apply a suitable first coating, for instance titanium white or lithopone in a lacquer of polystyrene, previously to the application of the luminous paint in order to secure a well reflecting and weatherproof support.

2. Into a solution consisting of 200 grams of vinyl naphthalene in a mixture of 200 grams of toluene, 200 grams of xylene, 200 grams of butyl acetate and 30 grams of tricresyl phosphate there are introduced about 0.8 kilogram of a luminous paint, for instance a well luminescent zinc sulfide or an organic boric acid luminous substance. The lacquer of luminous paint thus obtained is applied on any desired surfaces or articles which are to be made luminescent.

3. For the preparation of fluorescent and phosphorescent shaped bodies and foils or the like, about 2½ kilograms of a luminous paint, for instance on the base of calcium sulfide, strontium sufide or zinc sulfide, are introduced into about 12 liters of styrene; a small quantity of sulfuric acid is added and the whole is heated for about 4 hours to about 140° C. in order to produce polymerization. As soon as the required consistency is obtained, the mass is poured into the desired moulds and allowed to solidify. Foils can likewise be sprayed or rolled from this product.

We claim:

A composition comprising a polymerized aromatic hydrocarbon selected from the group consisting of polystyrene, polymerized vinyl naphthalene, polymerized vinyl tetrahydronaphthalene, polymerized methyl styrene, polymerized ethyl styrene, and polymerized methyl vinyl naphthalene, and embedded therein a phosphorescent substance of the group consisting of strontium sulfide/bismuth and rubidium, zinc sulfide, organic boric acid compounds, calcium sulfide, and strontium sulfide.

GEORG MEDER.
KONRAD SCHAD.